US008320330B2

(12) United States Patent
Baek et al.

(10) Patent No.: US 8,320,330 B2
(45) Date of Patent: Nov. 27, 2012

(54) SERVICE ZONE SWITCHING METHOD BASED ON LOAD CONSIDERING INTER-CELL INTERFERENCE IN 802.16/WIBRO SYSTEMS

(75) Inventors: Joo-Young Baek, Pohang (KR); Sok-Hyong Kim, Pohang (KR); Young-Joo Suh, Pohang (KR); Jeong-Yoon Lee, Pohang (KR)

(73) Assignees: Postech Academy-Industry Foundation, Pohang, Kyungsnagbook-Do (KR); Posco, Pohang, Kyungsangbook-Do (KR); Posdata Co., Ltd., Seongnam, Kyunggi-Do (KR); Posco Research Association, Pohang, Kyungsangbook-Do (KR)

( * ) Notice: Subject to any disclaimer, the term of this patent is extended or adjusted under 35 U.S.C. 154(b) by 780 days.

(21) Appl. No.: 12/436,314

(22) Filed: May 6, 2009

(65) Prior Publication Data
US 2009/0279505 A1 Nov. 12, 2009

(30) Foreign Application Priority Data

May 6, 2008 (KR) .................. 10-2008-0041869

(51) Int. Cl.
*H04W 4/00* (2009.01)
*H04W 72/00* (2009.01)
(52) U.S. Cl. .................. 370/331; 370/329; 455/450
(58) Field of Classification Search .................. 370/331
See application file for complete search history.

(56) References Cited

U.S. PATENT DOCUMENTS

| 8,023,529 | B2* | 9/2011 | Oh et al. | 370/468 |
|---|---|---|---|---|
| 2006/0205412 | A1* | 9/2006 | Oh et al. | 455/450 |
| 2007/0242769 | A1* | 10/2007 | Yang | 375/260 |
| 2007/0259635 | A1* | 11/2007 | Oh et al. | 455/186.1 |
| 2008/0075032 | A1* | 3/2008 | Balachandran et al. | 370/317 |
| 2008/0089278 | A1* | 4/2008 | Chang et al. | 370/329 |
| 2008/0232320 | A1* | 9/2008 | Lee et al. | 370/329 |
| 2010/0118996 | A1* | 5/2010 | Sundaresan et al. | 375/260 |

OTHER PUBLICATIONS

Heo, Joo et al., "A Novel Transmit Power Allocation Algorithm Combined with Dynamic Channel Allocation in Reuse Partitioning-based OFDMA/FDD System," IEEE International Conference on Communications ICC '06, pp. 5654-5659 (2006).
Korean Office Action for Application No. 10-2008-0041869, dated Jun. 21, 2010.

* cited by examiner

*Primary Examiner* — Guang Li
(74) *Attorney, Agent, or Firm* — Nelson Mullins Riley & Scarborough LLP; EuiHoon Lee, Esq.

(57) ABSTRACT

There is provided a method of switching a zone through which services are provided to subscriber stations (SS) in an environment using an FRF-1 zone and an FRF-3 zone based on traffic load of each zone in order to reduce the inter-cell interference in 802.16/WiBro systems. The service zone switching method based on load considering inter-cell interference in 802.16/WiBro systems may be useful to minimize the inter-cell interference, enhance the capacity of cells and improve users' transmission quality in the cells by determining whether the services are provided through one out of an FRF-1 zone (a zone where users in 3 sectors of one cell can use all subchannels) and an FRF-3 zone (a zone where users in each of 3 sectors of one cell can use one third of all subchannels; 3 sectors of one cell use 3 channel group, respectively), which are present in one frame, based on the distribution and traffic load of subscriber stations (SS) present in one cell, which consists of 3 sector units, under the environment of the 802.16/WiBro systems, and providing services through the selected zone.

5 Claims, 2 Drawing Sheets

SERVICE ZONE SWITCHING METHOD BASED ON LOAD CONSIDERING INTER-CELL INTERFERENCE IN 802.16/WIBRO SYSTEMS

CROSS-REFERENCE TO RELATED APPLICATIONS

This application claims the priority of Korean Patent Application No. 10-2008-0041869 filed on May 6, 2008, in the Korean Intellectual Property Office, the disclosure of which is incorporated herein by reference.

BACKGROUND OF THE INVENTION

1. Field of the Invention

The present invention relates to a method of switching a zone through which services are provided to subscriber stations (SS) in an environment using an FRF-1 zone and an FRF-3 zone based on traffic load of each zone in order to reduce the inter-cell interference in 802.16/WiBro systems, and more particularly, to a service zone switching method based on load considering inter-cell interference in 802.16/WiBro systems capable of minimizing the inter-cell interference, enhancing the capacity of cells and improving users' transmission quality in the cells by determining whether the services are provided through one out of an FRF-1 zone (a zone where users can use all subchannels) and an FRF-3 zone (a zone where users can use one third of all subchannels; dividing all channels into 3 channel groups), which are present in one frame, based on the distribution and traffic load of subscriber stations (SS) present in one cell, which consists of 3 sector units, under the environment of the 802.16/WiBro systems and providing services through the selected zone.

2. Description of the Related Art

As known to those skilled in the art, when all cells share the same frequency channels in the deployment of networks, the cells affect quality of used frequency channels in a wireless cellular system, which is called "interference." Then, such interference affects the capacity and coverage of the cells, which makes it difficult to provide satisfactory transmission quality to users.

In the case of conventional cellular networks, there have been various attempts to minimize interference between cells. For example, there is a channel assignment algorithm for assigning channels so that the channels used by just adjacent cells are not overlapped with each other. Also, there has been much research on a permutation technique of grouping subcarriers into channels in order to minimize overlapping of the channels used by adjacent cells under the environment of systems (i.e. OFDMA) that can assign the subcarriers into time and frequency domains.

Also as an alternative to reduce the interference, there has been an attempt to minimize the inter-cell interference by dividing an FRF method into an FRF-1 method where users in 3 sectors of one cell use the entire frequency bandwidth range and an FRF-3 method where users in each of 3 sectors of one cell use one third of frequency bandwidth range.

SUMMARY OF THE INVENTION

The present invention is designed to solve the problems of the prior art, and therefore it is an object of the present invention to provide a service zone switching method based on load considering inter-cell interference in 802.16/WiBro systems capable of minimizing the inter-cell interference, enhancing the capacity of cells and improving users' transmission quality in the cells by determining whether the services are provided through one out of an FRF-1 zone (a zone where users in 3 sectors of one cell can use all subchannels) and an FRF-3 zone (a zone where users in each of 3 sectors of one cell can use one third of all subchannels; 3 sectors of one cell use 3 channel group, respectively), which are present in one frame, based on the distribution and traffic load of subscriber stations (SS) present in one cell, which consists of 3 sector units, under the environment of the 802.16/WiBro systems and providing services through the selected zone.

According to an aspect of the present invention, there is provided a service zone switching method based on load considering inter-cell interference in 802.16/WiBro systems, including: selecting one out of an FRF-1 zone and an FRF-3 zone in one frame based on the distribution and traffic load of subscriber stations (SS) present in the one cell; and providing services through the selected FRF-1 zone or FRF-3 zone, wherein the one cell in the 802.16/WiBro Systems consists of 3 sectors and each sector has a base station (BS), each BS supports services for the FRF-1 zone and the FRF-3 zone under the environment of the 802.16/WiBro systems, the FRF-1 zone is a zone where users in 3 sectors of the one cell can use all subchannels, the FRF-3 zone is a zone where users in each of 3 sectors of the one cell can use one third of all subchannels.

Also, in order to realize the service zone switching method based on load considering inter-cell interference in 802.16/WiBro systems, it is assumed that all base stations and the subscriber stations have information on geographical positions, all the base stations have the same boundary between the FRF-1 zone and the FRF-3 zone present in the one frame, and have frame values synchronized with the same level in every base station to realize the service zone switching method based on load considering inter-cell interference in 802.16/WiBro systems.

In addition, the service zone switching method may further include: selecting either the FRF-1 zone or FRF-3 zone based on current positions of the subscriber stations; and providing, at subscriber stations present within a certain distance from a base station, services through the FRF-1 zone and providing, at subscriber stations present out of the certain distance from the base station, services through the FRF-3 zone, wherein the certain distance is set to any value.

Also, the service zone switching method may further include: calculating a density rate of the corresponding FRF zone based on the service reserved rate where the subscriber stations are being provided with the services, wherein the density rate is calculated as represented by the following Equation.

---

*Density rate ($D_{FRF-1}$ & $D_{FRF-3}$):

$$D_{FRF-1} = \sum_{i \in FRF(i)}^{N} s_i$$

$$s_i(t) = \sum_{i \in b(i)}^{N} r_i / MC_i(t), \; r; \text{reserved\_rate}$$

$MC_i(t)$: Modulation & CodingRate_of_flow_i_at_frame_t

---

Furthermore, the service zone switching method may further include: determining whether the corresponding subscriber stations provide services through either the FRF-1 zone or FRF-3 zone, by comparing the system capacity with the average density rate of the corresponding zone at a certain period, after calculating the density rate; providing the capacity of the system and QoS services while providing the solution to loadable situations of a service zone by choosing, as victims, subscriber stations having the greatest influence on causing the loadable situations of the corresponding zone when a loadable zone is present in the FRF-1 zone or FRF-3 zone and choosing victim subscriber stations until the corresponding zone is out of the loadable situations when the corresponding subscriber stations move to another zone.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of a service zone switching method based on load considering inter-cell interference in 802.16/WiBro systems will now be described in detail with reference to the accompanying drawings. For the exemplary embodiments of the present invention, detailed descriptions of known functions and constructions that are related to the present invention are omitted for clarity when they are proven to make the gist of the present invention unnecessarily confusing. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
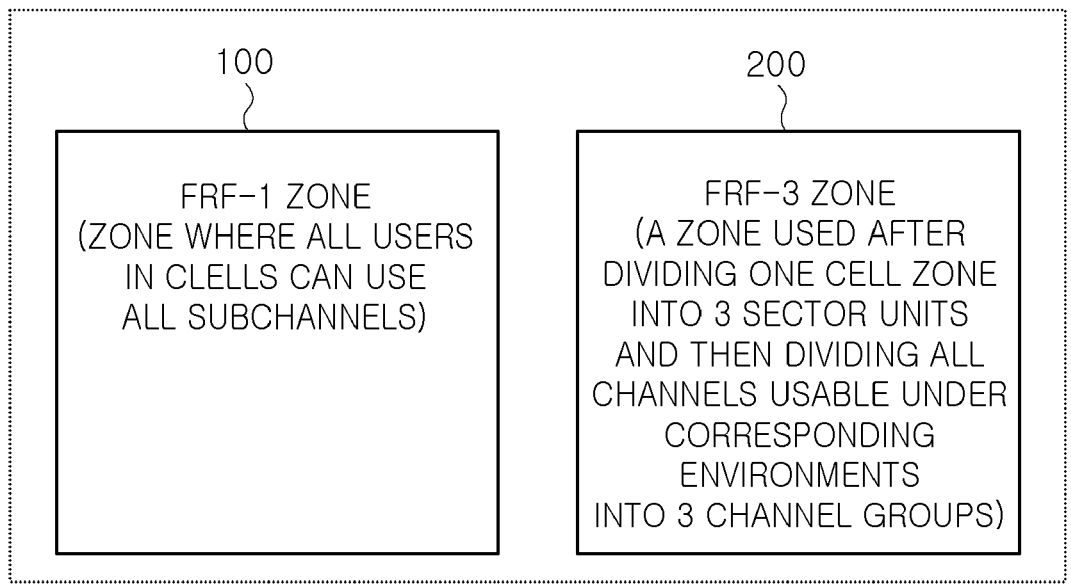
FIG. 1 is a diagram showing a zone, used in the present invention, including an FRF-1 zone and an FRF-3 zone.
Figure 2:
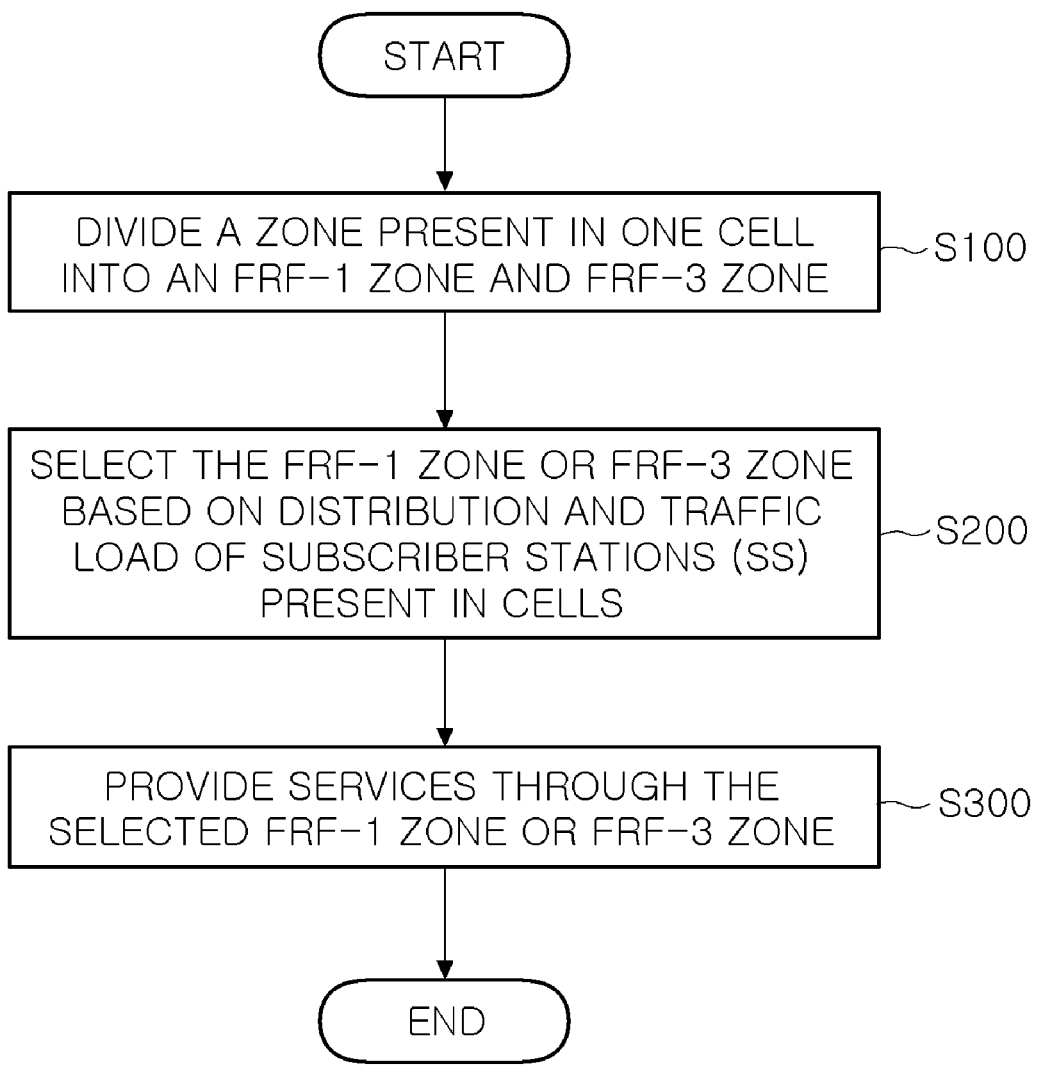
FIG. 2 is a flowchart illustrating a service zone switching method based on load considering inter-cell interference in 802.16/WiBro systems according to one exemplary embodiment of the present invention.

FIG. 1 is a diagram showing a zone, used in the present invention, including an FRF-1 zone and an FRF-3 zone, and FIG. 2 is a flowchart illustrating a service zone switching method based on load considering inter-cell interference in 802.16/WiBro systems according to one exemplary embodiment of the present invention.

Referring to FIGS. 1 and 2, the service zone switching method based on load considering inter-cell interference in 802.16/WiBro systems according to one exemplary embodiment of the present invention includes: dividing a zone present in one cell into an FRF-1 zone 100 (a zone where users in 3 sectors of one cell can use all subchannels) and an FRF-3 zone 200 (a zone where users in each of 3 sectors of one cell can use one third of all subchannels; 3 sectors of one cell use 3 channel group, respectively) under the environment of the 802.16/WiBro systems (S100); selecting one out of the FRF-1 zone 100 and the FRF-3 zone 200 in one frame based on the distribution and traffic load of subscriber stations (SS) present in the one cell (S200); and providing services through the selected FRF-1 zone 100 or FRF-3 zone 200 (S300).

Hereinafter, the service zone switching method based on load considering inter-cell interference in 802.16/WiBro systems according to one exemplary embodiment of the present invention, thus configured, is described in more detail, as follows.

First, the system environment used in the present invention is an OFDMA environment, among the environments of 802.16 systems, where subcarriers may be divided and used according to the time and frequency to provide services at the 802.16 system by one frame unit. In this case, one zone in one cell is divided into a variety of zones according to a frequency permutation method, that is, an available frequency range, and the divided zones have different characteristics. In addition, one cell consists of 3 sectors and each sector can use FRF-1 zone and FRF-3 zone. The present invention targets a zone 100 where all users in 3 sectors of one cell can use all subchannels in such an environment (FIG. 1); and a zone 200 where users in each of 3 sectors of one cell can use one third of all subchannels (FIG. 1). Hereinafter, both of the zones are referred respectively to as an FRF-1 zone 100 and an FRF-3 zone 200 throughout the specification, considering frequency reuse factors of each zone.

When the 802.16 system provides services by frame unit, the 802.16 system may provide the services through a variety of zones in one frame, and may minimize the inter-cell interference in such an environment by suitably employing the FRF-1 zone 100 and the FRF-3 zone 200, thus to enhance capacity of cells and improve users' transmission quality in the cells.

The service zone switching method according to one exemplary embodiment of the present invention includes: determining whether the services are provided through one out of an FRF-1 zone 100 and an FRF-3 zone 200, which are present in one frame, based on the distribution and traffic load of subscriber stations (SS) present in one cell under the environment of the 802.16 systems, and providing services through the selected zone (S200).

The underlying assumptions used in the present invention are as follows.

Base stations (BS) support services of the FRF-1 and FRF-3 zones.

Base stations and subscriber stations have information on geographical positions.

All the base stations have the same boundary between the FRF-1 and FRF-3 zones present in one frame, and frame values synchronized with the same level.

Based on the above-mentioned assumptions, the service zone switching method according to one exemplary embodiment of the present invention includes: determining a service zone for all the subscriber stations, and determining whether the services are provided through the determined zone or a zone is switched by calculating a service state of each zone and a service state of the subscriber stations.

The service zone switching method according to one exemplary embodiment of the present invention present invention is divided into two steps: an initial step (init step) and a transition step. The initial step is carried out in a step where an 802.16 base station system provides services to subscriber stations present in its own cells for the first time. The subscriber stations are provided with the services through the zone selected in the initial step. In this case, a service zone is switched in the consideration of the interference based on the traffic load and distribution of the subscriber stations while being provided with the services through the 802.16 base station system. During this transition step, a service zone of the corresponding subscriber stations is switched into another service zone.

The above-mentioned initial step is described in more detail, as follows.

In an initial step, an FRF-1 zone 100 or an FRF-3 zone 200 is selected based on the current positions of subscriber stations. Subscriber stations present within a certain distance from a base station provide services through the FRF-1 zone 100, and subscriber stations present out of the certain distance from the base station provide services through the FRF-3 zone 200. In this case, the certain distance (x) used as the standard distance is set to any predetermined value.

The transition step after the initial step is described in more detail, as follows.

A density rate of the corresponding FRF zone is calculated based on the service reserved rate of a flow where the subscriber stations are being provided with the services. In this case, the density rate is calculated as represented by the following Equation.

*Density rate ($D_{FRF-1}$ & $D_{FRF-3}$):

$$D_{FRF-1} = \sum_{i \in FRF(i)}^{N} s_i$$

$$s_i(t) = \sum_{i \in b(i)}^{N} r_i / MC_i(t), r: \text{reserved\_rate}$$

$MC_i(t)$: Modulation & CodingRate_of_flow_i_at_frame_t

Then, the service zone switching method according to one exemplary embodiment of the present invention includes: determining whether the corresponding subscriber stations provide services through either the FRF-1 zone 100 or FRF-3 zone 200, by comparing the system capacity with the average density rate of the corresponding zone at a certain period, after calculating the density rate. Then, the service zone switching method according to one exemplary embodiment of the present invention includes: providing the capacity of the system and QoS services while providing the solution to loadable situations of a service zone by choosing, as victims, subscriber stations having the greatest influence on causing the loadable situations of the corresponding zone when a loadable zone is present in the FRF-1 zone 100 or FRF-3 zone 200, and choosing victim subscriber stations until the corresponding zone is out of the loadable situations by allowing the corresponding subscriber stations to move to another zone.

Pseudo codes used in the entire flow of the service zone switching method according to one exemplary embodiment of the present invention are listed, as follows.

```
Init Step
    For i = 1 ... N
        If( Distance between SS_i and BS < x )
            Assign FRF-1 zone to SS_i
        Else
            Assign FRF-3 zone to SSi
Transition Step
    Calculate the average D_FRF-1 and D_FRF-3
    If current frame becomes the certain periodic
        If ( C_FRF-1 > D_FRF-1 && C_FRF-3 > D_FRF-3 )
            Service SSs through the selected zones
        else
            if ( C_FRF-1 < D_FRF-1 )
            do
                Choose the victim as the highest loadable SS_i
                Change the service zone of the SS_j
                D_FRF-1 -= Allocated bandwidth of the SS_j
                Set j as the index of the second highest loadable SS
            while (C_FRF-1 > D_FRF-1)
            if ( C_FRF-3 < D_FRF-3)
            do
                Choose the victim as the highest loadable SS_j
```

-continued

```
            If( D_FRF-1 + Allocated bandwidth of the SS_j < C_FRF-1 )
                Change the service zone of the SS_j
                D_FRF-3 -= Allocated bandwidth of the SS_j
                Set j as the index of the second highest loadable SS
            while (C_FRF-3 > D_FRF-3 || Empty SS set which should
            be assigned service zone)
```

As described above, the service zone switching method based on load considering inter-cell interference in 802.16/WiBro systems according to one exemplary embodiment of the present invention may be useful to minimize the inter-cell interference, enhance the capacity of cells and improve users' transmission quality in the cells by determining whether the services are provided through one out of an FRF-1 zone and an FRF-3 zone, which are present in one frame, based on the distribution and traffic load of subscriber stations (SS) present in one cell under the environment of the 802.16/WiBro systems, and providing services through the selected zone.

While the present invention has been shown and described in connection with the exemplary embodiments, it will be apparent to those skilled in the art that modifications and variations can be made without departing from the scope of the invention as defined by the appended claims. Therefore, it will be considered that the modifications and variations of the present invention can be included in the scope of the invention

What is claimed is:

1. A service zone switching method based on load considering inter-cell interference in 802.16/WiBro system, comprising:
    selecting one of Frequency Reuse Factor (FRF)-1 zone and an FRF-3 zone in a single frame, based on the distribution and traffic load of subscriber stations present in a single cell;
    providing services through the selected FRF-1 zone or FRF-3 zone for the subscriber stations;
    calculating a density rate of FRF-1 zone or FRF-3 zone based on a service reserved rate at which the subscriber stations are being provided with the services;
    determining whether the subscriber stations are being provided with the services through the FRF-1 zone or FRF-3 zone by comparing system capacity with average density rate of the FRF-1 zone and FRF-3 zone;
    selecting a subscriber station as a victim and moving the victim to another FRF zone when a loadable zone is present in the FRF-1 zone or FRF-3 zone, wherein the victim has a greatest influence on causing the loadable situation of the corresponding zone; and
    moving the victim to another FRF zone until the corresponding zone is out of the loadable situation,
    wherein the single cell in the 802.16/WiBro system consists of 3 sectors and each sector has a base station, each base station supports services for the FRF-1 zone and the FRF-3 zone under the environment of the 802.16/WiBro system, the FRF-1 zone is a zone in which users in 3 sectors of the single cell can use all subchannels, and the FRF-3 zone is a zone in which users in each of the 3 sectors of the single cell can use one third of all subchannels.

2. The service zone switching method of claim 1,
    wherein all base stations and the subscriber stations have information on geographical positions, all the base stations have the same boundary between the FRF-1 zone and the FRF-3 zone present in the one frame, and have frame values synchronized with the same level in every base station to realize the service zone switching method based on load considering inter-cell interference in 802.16/WiBro systems.

3. The service zone switching method of claim 1, further comprising:
   selecting either the FRF-1 zone or FRF-3 zone based on current positions of the subscriber stations; and
   providing, at subscriber stations present within a certain distance from a base station, services through the FRF-1 zone and providing, at subscriber stations present out of the certain distance from the base station, services through the FRF-3 zone,
   wherein the certain distance is set to any value.

4. A service zone switching method based on load considering inter-cell interference in 802.16/WiBro system, comprising:
   selecting one of Frequency Reuse Factor (FRF)-1 zone and FRF-3 zone in a single frame based on current positions of subscriber stations present in a single cell;
   providing, to subscriber stations present within a certain distance from a base station, services through the FRF-1 zone and providing, to subscriber stations present outside of the certain distance from the base station, services through the FRF-3 zone, wherein the certain distance is set to any value; and
   calculating a density rate of the corresponding FRF zone based on a service reserved rate where the subscriber stations are being provided with the services
   wherein the single cell in the 802.16/WiBro system consists of 3 sectors and each sector has a base station, each base station supports services for the FRF-1 zone and the FRF-3 zone under the environment of the 802.16/WiBro system, the FRF-1 zone is a zone in which users in 3 sectors of the single cell can use all subchannels, and the FRF-3 zone is a zone in which users in each of the 3 sectors of the single cell can use one third of all subchannels,
   wherein the density rate is calculated as represented by the following Equation

---

*Density rate ($D_{FRF-1}$ & $D_{FRF-3}$):

$$D_{FRF-1} = \sum_{i \in FRF(i)}^{N} s_i$$

$$s_i(t) = \sum_{i \in b(i)}^{N} r_i / MC_i(t), r_i \text{ reserved\_rate}$$

$MC_i(t)$: Modulation & CodingRate_of_flow_i_at_frame_t.

---

5. The service zone switching method of claim 4, further comprising:
   determining whether the corresponding subscriber stations provide services through either the FRF-1 zone or FRF-3 zone, by comparing the system capacity with the average density rate of the corresponding zone at a certain period, after calculating the density rate;
   providing the capacity of the system and QoS services while providing the solution to loadable situations of a service zone by choosing, as victims, subscriber stations having the greatest influence on causing the loadable situations of the corresponding zone when a loadable zone is present in the FRF-1 zone or FRF-3 zone and choosing victim subscriber stations until the corresponding zone is out of the loadable situations when the corresponding subscriber stations move to another zone.

* * * * *